(12) United States Patent
Broger

(10) Patent No.: US 9,073,147 B2
(45) Date of Patent: Jul. 7, 2015

(54) LASER MACHINING HEAD

(75) Inventor: David Broger, Burgdorf (CH)

(73) Assignee: Bystronic Laser AG, Niederoenz (CH)

( * ) Notice: Subject to any disclaimer, the term of this patent is extended or adjusted under 35 U.S.C. 154(b) by 288 days.

(21) Appl. No.: 13/816,495

(22) PCT Filed: Sep. 20, 2011

(86) PCT No.: PCT/IB2011/054127
§ 371 (c)(1),
(2), (4) Date: Mar. 18, 2013

(87) PCT Pub. No.: WO2012/052863
PCT Pub. Date: Apr. 26, 2012

(65) Prior Publication Data
US 2013/0193119 A1  Aug. 1, 2013

Related U.S. Application Data

(60) Provisional application No. 61/405,112, filed on Oct. 20, 2010.

(30) Foreign Application Priority Data

Oct. 20, 2010 (EP) .................................... 10188198

(51) Int. Cl.
*B23K 26/04* (2014.01)
*B23K 26/38* (2014.01)
*B23K 26/03* (2006.01)
*B23K 26/14* (2014.01)

(52) U.S. Cl.
CPC .................. *B23K 26/03* (2013.01); *B23K 26/04* (2013.01); *B23K 26/046* (2013.01); *B23K 26/048* (2013.01); *B23K 26/1464* (2013.01); *B23K 26/38* (2013.01)

(58) Field of Classification Search
CPC ................................ B23K 26/04; B23K 26/38
USPC .............. 219/121.61–121.72, 121.81, 121.83
See application file for complete search history.

(56) References Cited

U.S. PATENT DOCUMENTS

| 5,128,508 A | 7/1992 | Klingel |
| 6,822,187 B1 | 11/2004 | Hermann et al. |

(Continued)

FOREIGN PATENT DOCUMENTS

| CN | 201220326 Y | 4/2009 |
| DE | 4035404 A1 | 5/1992 |

(Continued)

OTHER PUBLICATIONS

EPO Search Report and Written Opinion, from priority appl.No. EP10188198 of the present application; dated Mar. 16, 2011; in German.

(Continued)

*Primary Examiner* — Samuel M Heinrich
(74) *Attorney, Agent, or Firm* — George Kapsalas; Patentbuero Paul Rosenich AG

(57) ABSTRACT

The invention relates to a laser machining head for a laser machining machine, comprising a mount (2) for a sensor part (3) formed from electrically conductive material, an outer insulation part (4) made from electrically insulating material, preferably made from plastic, for electrical shielding and an inner insulation part (5) inserted within the outer insulation part (4) as radiation shield, wherein the inner insulation part (5) is formed from metal and is electrically insulated from the sensor part (3).

20 Claims, 3 Drawing Sheets

(56) References Cited

Figure 1:
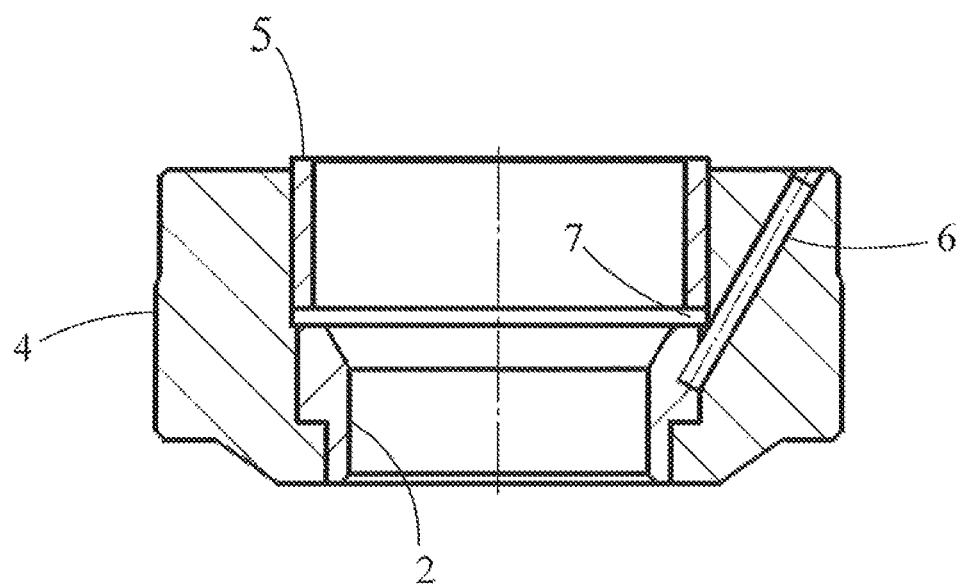

U.S. PATENT DOCUMENTS 8,247,732 B2 * 8/2012 Weick et al. ............. 219/121.62
2008/0264914 A1 10/2008 Weick et al.

FOREIGN PATENT DOCUMENTS

| DE | 4201640 C1 | 2/1993 |
|---|---|---|
| WO | 2007/073745 A1 | 7/2007 |
| WO | 2012/011072 A1 | 1/2012 |

OTHER PUBLICATIONS

International Search Report and International Preliminary Report on Patentability, dated Dec. 21, 2011, from parent PCT/IB2011/054127; in English.

* cited by examiner

LASER MACHINING HEAD

This application is a 35 U.S.C. 371 national-phase entry of PCT International application no. PCT/IB2011/054127 filed on Sep. 20, 2011 and also claims benefit of priority to prior European application no. EP10188198 filed on Oct. 20, 2010, and also claims priority as a non-provisional of U.S. provisional application Ser. No. 61/405,112 filed on Oct. 20, 2010, and both European application no. EP10188198 and U.S. provisional application Ser. No. 61/405,112, as well as parent PCT International application no. PCT/IB2011/054127, are all incorporated herein by reference in their entireties for all intents and purposes, as if identically set forth in full herein.

The invention relates to a laser machining head for a laser machining machine, comprising a mount for a sensor part formed from electrically conductive material, an outer insulation part made from electrically insulating material, preferably made from plastic, for electrical shielding and an inner insulation part inserted within the outer insulation part as radiation shield.

Due to the high power density for laser machining machines, a plurality of requirements are simultaneously placed on a laser machining head.

First, the interior of a laser machining head is continuously exposed to a high radiation load during laser cutting and must be correspondingly protected. Furthermore, to measure the distance between the laser machining nozzle and the workpiece to be machined, a sensor mechanism must be provided, which also operates reliably under extreme conditions. Usually, this distance measurement takes place capacitively, that is to say the capacitance formed by the laser machining head or the sensor part and by the workpiece is measured. This usually takes place via a frequency measurement of the resulting resonant circuit. In order not to receive false results, the laser machining head must be outwardly electrically insulated.

Today, ceramic parts are generally used for elec. insulation of the cutting nozzle from the rest of the cutting head and the machine. As ceramic breaks easily, plastic lends itself as an alternative.

Prior document WO 2007/073745A1 discloses a sensor arrangement for a laser machining machine. For the above-mentioned electrical insulation, this published document suggests to produce the external casing of the laser machining head out of plastic, that is to say a non-conductive material.

Without a further measure, the interior of the casing or the walls of the laser channel would constantly be exposed to the intensive laser radiation. As plastic does not offer sufficient resistance with respect to radiation, radiation damage brings about a rapid ageing of the plastic and necessitates constant exchange of the laser machining head which is both cost- and maintenance-intensive.

To bypass this problem, WO 2007/073745A1 suggests using an inner shielding or an additional inner insulation part made from a non-conductive, heat-resistant material for protecting against laser radiation and/or heat. This inner insulation part is inserted in the form of a tube section into the outer insulation part made from plastic. Quartz glass and ceramic are specified as suitable materials.

The outer insulation part made from plastic is used for electrical shielding and the inner shielding part made from electrically non-conductive heat-resistant material is used for shielding against laser radiation and/or heat.

However, the materials used are not optimal both with regards to their radiation resistance and their mechanical characteristics. The constant high temperature differences between switched-on and switched-off state mean that these materials fatigue, develop cracks or break completely. Consequently, premature exchange is unavoidable.

U.S. Pat. No. 5,128,508A discloses a nozzle assembly for a laser cutting head having a receptacle of insulating material with a central passage therethrough. The receptacle holds an insert of conductive material for mounting the nozzle. The nozzle serves as electrode, which is connected via the insert and a conductor running within the receptacle to a measuring and control apparatus. The receptacle of insulating material does not accommodate an additional inner shield. The receptacle is held against the neck of a cutting head by means of a coupling which may be threadably engaged on the cutting head. There is no direct mechanical connection between the receptacle and the neck. Only an indirect connection is provided by means of the coupling making the receptacle detachable from the neck. The disadvantages of such a laser cutting head can be seen in the lack of any additional shielding covering the inner surface of the receptacle. The lower part of the neck covers only the upper part of the receptacle's inner surface and serves just as recess for centering the receptacle on the laser cutting head. In the case the neck portion is destroyed by radiation it has to be exchanged. However, since the neck is accessible only when the receptacle is removed and since the neck is not detachable from the laser cutting head time and costs for exchange are extremely high.

U.S. Pat. No. 6,822,187B1 discloses a laser cutting or welding device, the device having a laser head and a robot, wherein the laser is attached to the robot. The duct for the laser beam before ending into the nozzle does not have any additional inner radiation shield. Life time of such a head is shortened and the exchange of parts damaged by radiation is very costly.

DE 4035404A1 relates to a metallic laser nozzle for a machining device. In order to electrically insulate the laser head to the outside an outer body of electrically insulating material is provided. However, the disadvantage of such a system consists in the fact, that there is no insulation of the nozzle electrode to other parts of the laser head. Thus, measurement errors and artefacts may occur.

DE 4201640C1 discloses a similar assembly as U.S. Pat. No. 5,128,508A.

The invention seeks to overcome these disadvantages by providing a laser machining head which is radiation-resistant on the one hand, and on the other hand enables precise and reliable distance measurements between workpiece and laser machining nozzle. The laser machining head should therefore combine the following characteristics: durability due to effective shielding with respect to radiation, and a reliable and fault-free measurement of the workpiece distance. Furthermore, the laser machining head should be maintenance-free, inexpensive and simple to assemble.

These objects are achieved with a laser machining head of the type mentioned at the beginning with the inner insulation part formed from metal and electrically insulated from the sensor part.

The use of a metal as inner shielding with respect to the laser radiation ensures a reliable protection of the outer insulation part against the damaging action of radiation. At the same time, the heat converted in the laser machining head is efficiently and evenly distributed owing to the excellent thermal conductivity of metals, so that thermal stresses in the laser machining head brought about by temperature changes can be minimised greatly.

Due to the electrical separation of the metallic inner insulation part from the sensor part, the measurement of the workpiece distance by means of the determination of the capacitance is not negatively influenced. The insulation of the whole part is retained however, because the metallic shielding part is positioned in such a manner that no electrical contact with the sensor holder arises. The insulating action of the outer plastic part is therefore not impaired.

According to the invention, the laser machining head may be manufactured substantially less expensively. More particularly, a metal sleeve, e.g. made from brass, is substantially cheaper than a ceramic or a quartz glass. In contrast with the latter materials, metal is mechanically robust, so that even during the manufacturing process, no particular safety precautions must be met.

In a version the laser machining head has a laser machining head upper part and wherein the outer insulation part, the inner insulation part and the mount are formed as a part of a modular body which is detachably connected to the laser machining head upper part. The connection of the modular body to the laser machining head upper part may be done by a connection part provided as a link. The outer and inner isolation parts and the mount form a modular body which may be easily and in time-saving manner exchanged, if there are any damages on the modular body or some of its parts. The aim is to make the stressed inner shield together with the outer isolation part exchangeable.

In a version the inner insulation part is at least substantially enclosed by the outer insulation part. This makes a compact and space-saving assembly.

In a version the mount is at least partly enclosed by the outer insulation part. The inner shielding is done by the upper inner isolation part and the lower mount, so that at least substantially the whole inner surface of the outer insulation part is covered by these metal parts.

In a version at least the portion of the outer insulation part which encloses the inner insulation part has a cylindrical outer surface. Such a shape improves the space-saving performance and the mounting simplifies the mounting mechanism to the laser machining head upper part.

In a version the outer insulation part has an at least substantially cylindrical outer surface, which further improves compactness and space-saving.

In a version the laser machining head is characterised by a fixed mechanical connection between the inner insulation part and the outer insulation part, wherein preferably the inner insulation part is pressed into or adhesively bonded to or cast into the outer insulation part. In such a way the inner and outer insulation part form a compact body. With such a direct connection between the inner insulation part and the outer insulation part no further coupling means are necessary to connect these parts.

Further configurations of the invention are specified in the drawings and in the disclosure.

The reference list is part of the disclosure.

The invention is explained in more detail symbolically and by way of example on the basis of the appended figures. The figures are described in a cohesive and comprehensive manner. The same reference symbols denote the same components, while reference symbols with different indices indicate functionally identical or similar components.

In the figures

Figure 2:
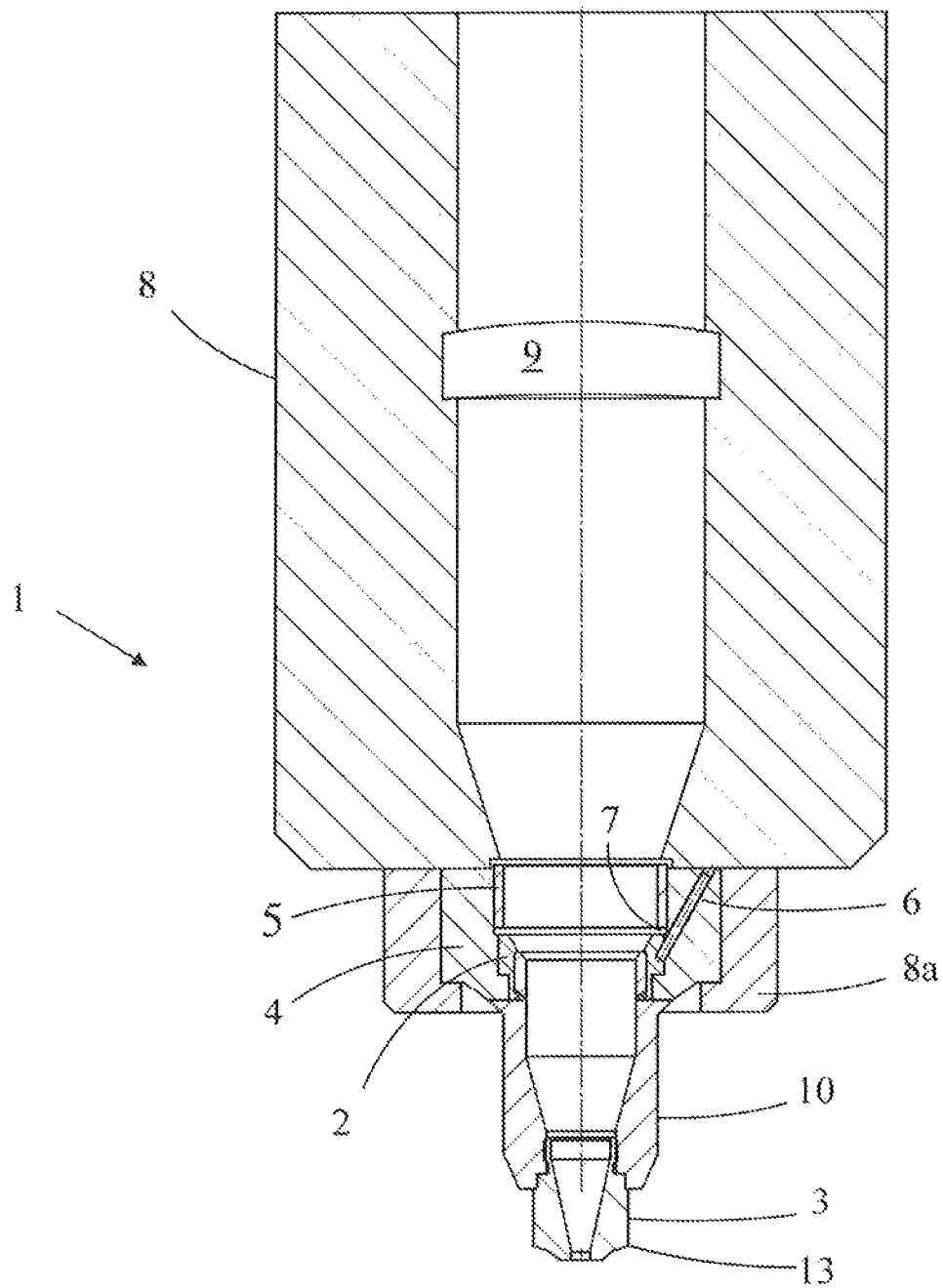
Figure 3:
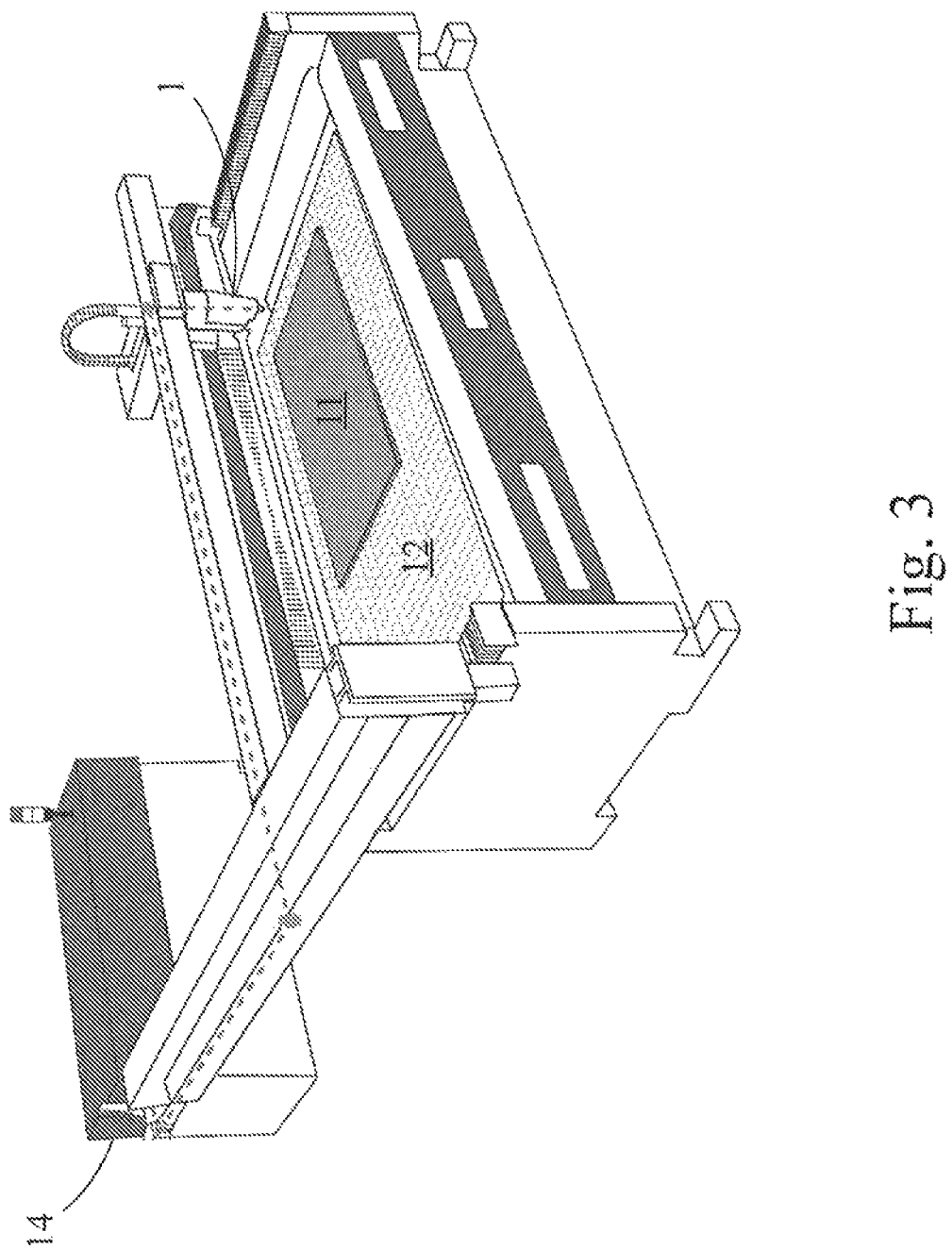

FIG. 1—shows an insulation section of a laser machining head according to the invention, FIG. 2—shows a laser machining head with laser machining head upper part and fixed insulation section with cutting nozzle, FIG. 3—shows a laser machining machine.

FIG. 1 shows an insulation section according to the invention of a laser machining head 1 for use in a laser machining machine (visible in FIG. 3). The insulation section of the laser machining head 1 consisting of an outer insulation part 4 and an inner insulation part 5 holds a mount 2 for a sensor part 3. Preferably, the sensor part 3 forms a single common component together with the laser machining nozzle 13 (visible in FIG. 2). In this case, the laser machining nozzle 13 is likewise constructed from metal and the mount 2 forms a type of metal interface between a contact pin 6 and the sensor part 3. The mount 2 is located within an outer insulation part 4 with cylindrical or conical inner bore and is held by the same.

The component which combines the sensor part 3 and the laser machining nozzle 13 is held by the mount 2 in the exemplary embodiment shown with insertion of a conductive intermediate piece 10. The mount 2 is thus also to be understood in the sense of "holder". The fixing of the laser machining nozzle 13 or the sensor part 3 on the mount 2 can namely also take place by means of insertion of one or a plurality of intermediate pieces 10.

In the operating state, the sensor part 3 forms a pole of a capacitance, the second pole of which is the workpiece 11 to be machined (as can be seen from FIG. 3). The determination of the capacitance is known per se in the prior art and is e.g. described in WO 2007/073745A1 which has equivalent publication US20080264914A1, the disclosures of which are incorporated herein by reference in the present description.

A contact pin 6 penetrates the outer insulation part 4 obliquely from the side and is in electrical contact with the mount 2, which in turn is in electrical contact with the nozzle/sensor part component 3, 13. The contact pin 6 is therefore used for the contacting of the sensor part 3 for forming a capacitance, the size of which depends on the workpiece distance.

In the upper region of the insulation section of the laser machining head 1, an inner insulation part 5 in the form of a sleeve made from a metallic material is inserted in the outer insulation part 4. The space enclosed by the inner insulation part 5 is the laser channel. The inner insulation part 5 is effectively electrically insulated with respect to the sensor part 3. In the exemplary embodiment shown, an air gap 7 is provided as effective electrical insulation for this purpose between the inner insulation part 5 and the mount 2 for the laser machining nozzle or the sensor part 3.

Alternatively, an annular web projecting inwardly from the outer insulation part 4 can also space the inner insulation part 5 from the electrically conductive mount 2, or an additional non-conductive ring can be inserted.

The laser machining head 1, particularly the outer and the inner insulation part 4, 5 and the laser channel are constructed cylindrically or conically, at least in sections. The inner insulation part 5 can therefore be constructed as a simple metal sleeve. In alternative designs, the sleeve can also be constructed in a conical, tapered, etc. manner.

The metallic inner insulation part 5 can be pressed, adhesively bonded or cast into the outer insulation part 4, so that a fixed mechanical connection is present. Particularly preferred metals for the inner insulation part 5 are brass, aluminium, copper and high-grade steel.

FIG. 2 shows the laser machining head 1 with pushed-in or screwed-in laser machining nozzle 13. The insulation section formed from the insulation parts 4 and 5 is releasably connected to a laser machining head upper part 8. To this end, a connection part 8a is provided as link. The laser machining head upper part 8 and the connection part 8a can e.g. be made from metal. As can be seen from FIG. 2, an electrical insulation of the connection part 8a with respect to the mount 2, with respect to the intermediate piece 10 or with respect to the sensor part 3 results due to the outer insulation part 4.

The insulation section illustrated in FIG. 1 is arranged between the laser machining head upper part 8 and the mount 2 (FIG. 2) and connects these two components. The function of the insulation section lies in the electrical insulation of the sensor part 3 from the rest of the laser machining head 1, in the example illustrated, from the laser machining head upper part 8. This function is achieved by means of the outer insulation part 4. As radiation insulation, the inner insulation part 5 protects the outer insulation part 4 from radiation and heat.

A laser beam shaping optic 9 in the interior of the laser machining head upper part 8 ensures a corresponding adaptation of the laser beam to the workpiece requirements.

FIG. 3 shows a laser machining machine with a workpiece support 12, and, situated thereupon, a workpiece 11 to be machined. The workpiece 11 forms a capacitance together with the sensor part 3 at the tip of the laser machining head 1. This capacitance is measured by means of a control/evaluation device 14.

REFERENCE LABELS LIST

1—Laser machining head
2—Mount for the sensor part
3—Sensor part
4—Outer insulation part
5—Inner insulation part
6—Contact pin
7—Air gap
8—Laser machining head upper part
8a—Connection part
9—Laser beam shaping optic
10—Intermediate piece
11—Workpiece
12—Workpiece support
13—Laser machining nozzle
14—Control/evaluation device

What is claimed is:

1. A laser machining head comprising:
an electrically conductive sensor part;
a laser machining nozzle, said laser machining nozzle being integrated with said sensor part;
an electrically conductive mount configured to hold said sensor part;
an outer insulation part disposed around said mount, said outer insulation part being made of electrically insulating material, and said outer insulation part at least partially enclosing said mount;
a metallic inner insulation part disposed within said outer insulation part, said inner insulation part forming a radiation shield, said inner insulation part being at least partially enclosed by said outer insulation part, said inner insulation part having the form of a sleeve, and said inner insulation part being electrically insulated from all other electrically conductive parts of the laser machining head;
a fixed mechanical connection between said inner insulation part and said outer insulation part;
a portion of said outer insulation part enclosing said inner insulation part, said portion of said outer insulation part having a cylindrical outer surface;
an effective electrical insulation configured to electrically isolate said metallic inner insulation part from electrical communication with said electrically conductive sensor part, said electrical insulation disposed between said inner insulation part and said electrically conductive sensor part;
a laser machining head upper part;
a modular body detachably connected to said laser machining head upper part; said modular body including said outer insulation part, said metallic inner insulation part, and said mount; and,
said modular body having an insulation section between said laser machining head upper part and said mount, said insulation section including said outer insulation part and said metallic inner insulation part.

2. A laser machining head comprising:
an electrically conductive sensor part;
a laser machining nozzle, said laser machining nozzle being integrated with said sensor part;
an electrically conductive mount configured to hold said sensor part;
an outer insulation part disposed around said mount, said outer insulation part being made of electrically insulating material, and said outer insulation part at least partially enclosing said mount;
a metallic inner insulation part disposed within said outer insulation part, said inner insulation part forming a radiation shield, said inner insulation part being at least partially enclosed by said outer insulation part, and said metallic inner insulation part being electrically insulated from all other electrically conductive parts of the laser machining head;
a fixed mechanical connection between said inner insulation part and said outer insulation part;
an effective electrical insulation configured to electrically isolate said metallic inner insulation part from electrical communication with said electrically conductive sensor part, said electrical insulation disposed between said inner insulation part and said electrically conductive sensor part;
a laser machining head upper part;
a modular body detachably connected to said laser machining head upper part; said modular body including said outer insulation part, said metallic inner insulation part, and said mount; and,
said modular body having an insulation section between said laser machining head upper part and said mount, said insulation section including said outer insulation part and said metallic inner insulation part.

3. A laser machining head comprising:
an electrically conductive sensor part;
a mount configured to hold said sensor part;
an outer insulation part disposed around said mount, said outer insulation part being made of electrically insulating material;
a metallic inner insulation part disposed within said outer insulation part, said inner insulation part forming a radiation shield; and,
an effective electrical insulation configured to electrically isolate said metallic inner insulation part from electrical communication with said electrically conductive sensor part, said electrical insulation disposed between said inner insulation part and said electrically conductive sensor part.

4. The laser machining head as claimed in claim 3 wherein: said mount is electrically conductive.

5. A laser machining head as claimed in claim 3 further comprising:
said effective electrical insulation including an annular air gap between said metallic inner insulation part and said mount.

6. A laser machining head as claimed in claim 3 further comprising:
said effective electrical insulation including a web projecting from said outer insulation part, said web projecting between said metallic inner insulation part and said mount.

7. A laser machining head as claimed in claim 3 further comprising:
said effective electrical insulation includes a non-conductive ring inserted between said metallic inner insulation part and said mount.

8. The laser machining head as claimed in claim 3 wherein:
said metallic inner insulation part has the form of a sleeve.

9. The laser machining head as claimed in claim 3 wherein:
said metallic inner insulation part is electrically insulated from all other electrically conductive parts of the laser machining head.

10. A laser machining head as claimed in claim 3 further comprising:
a laser machining nozzle, said laser machining nozzle being integrated with said sensor part.

11. A laser machining head as claimed in claim 3 further comprising:
an intermediate connection piece, said intermediate connection piece disposed between said mount and said sensor part.

12. A laser machining head as claimed in claim 3 further comprising:
a laser machining head upper part; and,
an insulation section between said laser machining head upper part and said mount, said insulation section including said outer insulation part and said metallic inner insulation part.

13. The laser machining head as claimed in claim 3 wherein:
said insulation section is releasably connected to said laser machining head upper part.

14. A laser machining head as claimed in claim 3 further comprising:
a laser machining head upper part; and,
a modular body detachably connected to said laser machining head upper part; said modular body including said outer insulation part, said metallic inner insulation part, and said mount.

15. The laser machining head as claimed in claim 3 wherein:
said inner insulation part is at least partially enclosed by said outer insulation part.

16. A laser machining head as claimed in claim 15 further comprising:
a portion of said outer insulation part encloses said inner insulation part; and,
said portion of said outer insulation part has a cylindrical outer surface.

17. The laser machining head as claimed in claim 3 wherein:
said mount is at least partially enclosed by said outer insulation part.

18. A laser machining head as claimed in claim 3 further comprising:
a fixed mechanical connection between said inner insulation part and said outer insulation part.

19. A laser machining head as claimed in claim 18 further comprising:
said fixed mechanical connection includes a pressfit of said inner insulation part.

20. A laser machining head as claimed in claim 18 further comprising:
said fixed mechanical connection includes an adhesive bond between said inner insulation part and said outer insulation part.

* * * * *